I. W. DAVIS.
DOOR HANGER TRACK AND SUPPORT.
APPLICATION FILED MAR. 29, 1909.
946,694.
Patented Jan. 18, 1910.
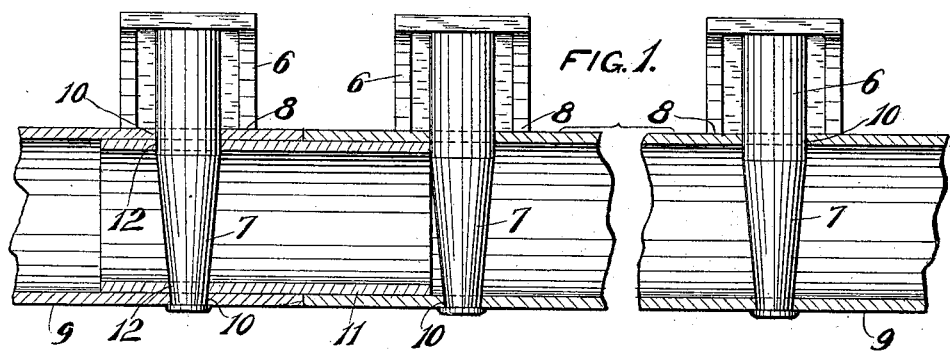
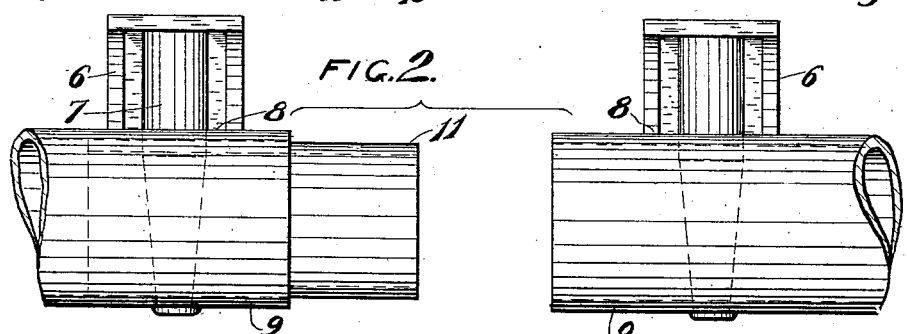
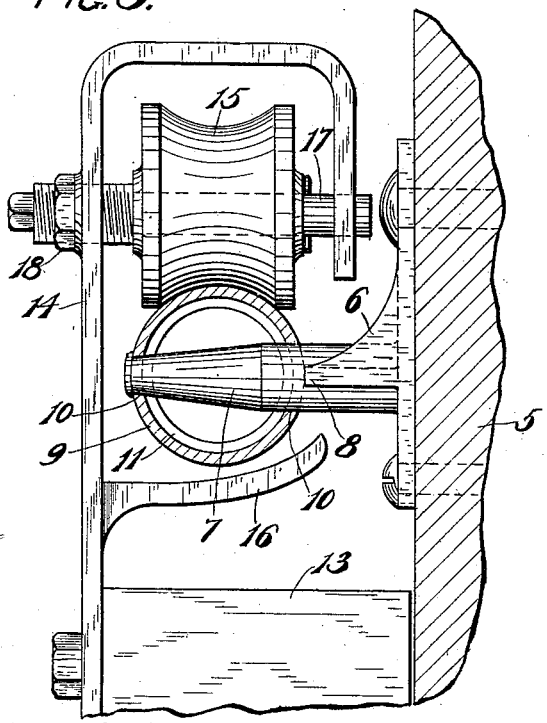
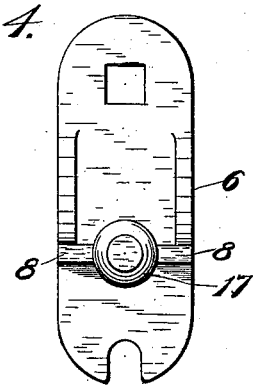
WITNESSES
INVENTOR.
Irvin W. Davis
By Benedict, Morsell & Caldwell
ATTORNEYS

UNITED STATES PATENT OFFICE.

IRVIN W. DAVIS, OF MILWAUKEE, WISCONSIN, ASSIGNOR OF ONE-HALF TO RUPERT A. NOURSE, OF MILWAUKEE, WISCONSIN.

DOOR-HANGER TRACK AND SUPPORT.

946,694.

Specification of Letters Patent. Patented Jan. 18, 1910.

Application filed March 29, 1909. Serial No. 486,347.

*To all whom it may concern:*

Be it known that I, IRVIN W. DAVIS, residing in Milwaukee, in the county of Milwaukee and State of Wisconsin, have invented new and useful Improvements in Door-Hanger Tracks and Supports, of which the following is a description, reference being had to the accompanying drawings, which are a part of this specification.

This invention relates to improvements in means for connecting and supporting tracks used in connection with sliding doors of that type in which sliding doors are suspended by a hanger from a track secured to the frame of a door-way.

One of the objects of this invention is to provide a track and support in which the track sections are adapted to be removably joined together at the ends of a connecting member which may be tubular, as shown in the drawing, or of any other desired form capable of connecting the parts together, said member connected to one end of the track section and adapted to be inserted into the end of the adjoining track section.

Another object of this invention is to provide a track and support in which the parts may be assembled and riveted together at the place of manufacture if desired, so that when a track is received by a purchaser it is only necessary to fasten up the brackets to the door frame and the track is finished and ready for the door and hanger.

A further object of this invention is to provide a track and support in which the track sections are connected together and supported without the necessity of providing said track sections with longitudinal slots which tend to weaken the structures so formed, whereby said track and support are rendered much stronger and durable.

With the above, and other objects in view, the invention consists of the device and its parts and combinations.

In the accompanying drawing, in which the same reference characters indicate the same parts in all of the views: Figure 1 is a top view of three supporting brackets and two track sections joined together, the tracks being in longitudinal section; Fig. 2 is a top view thereof, with the track sections spaced apart; Fig. 3 is a transverse sectional view of the track and its supporting bracket shown in connection with a door hanger and a fragment of a door; and Fig. 4 is a front view of one of the supporting brackets.

Referring to the drawing, the numeral 5 indicates a portion of the frame of a doorway to which is connected a supporting bracket 6 provided with a horizontally projecting tapering stud 7, round in cross section and provided with shoulders 8 integral therewith. The brackets are provided with bolt apertures for connecting them to the door frames.

The track which is shown as of tubular construction, consists of sections of tubes 9 provided with transverse perforations 10 near their ends and through which the studs 7 are adapted to extend and their ends upset to firmly rivet the parts together. A short joint member 11 provided near one end with transverse perforations 12 is adapted to be partly inserted in one of the ends of each pair of the abutting track sections with the apertures thereof in register with the apertures in said sections and the projecting stud of one of the brackets passing through all of said apertures and having its outer end upset to rivet the three parts together. The portion of the joint member 11 which extends from one end of a track section forms the connecting member end of the track and in assembling the track on a door frame this end is inserted in the open end of the abutting track sections to aline the two sections of the track. The joint members are of such dimension as to snugly fit within the ends of the track sections. The shoulders 8 on the projecting studs serve to properly position the tracks with relation thereto and when in position bear against the outer surfaces of the tracks.

The medial portions of the track sections are supported with brackets similar to the brackets which support the track ends and the track sections are medially apertured, transversely, in the same manner as at the ends.

The track is adapted to support a sliding door 13 suspended therefrom by a hanger 14 provided with a roller 15 and a guard 16. The hanger frame is adjustable with relation to the roller and the door frame by means of a spindle 17 threaded to the hanger frame and provided with a jam nut 18 to lock the spindle in adjusted positions.

From the foregoing description, it will be seen that the track and bracket are of simple construction and are inexpensive to manufacture and assemble and is strong and durable.

What I claim as my invention is:

1. A track and support, comprising a bracket provided with a projecting stud, a track provided with transverse apertures near its end, and a transversely apertured joint member positioned partly within the track end, said bracket stud extending through said apertures and provided with fastening means.

2. A track and support, comprising a bracket provided with a shouldered projecting stud, a tubular track section provided with transverse apertures near its end, and a transversely apertured joint member positioned partly within the track end, and its outer end adapted to be inserted in the end of another track section to aline the two sections together, said bracket stud extending through said apertures with the shoulder of the stud engaging a portion of the track and the end of the stud being upset to rivet the bracket, the tracks and the joint member together.

3. A joint for a door hanger track, comprising tubular track sections having abutting ends, a joint member partly inserted in both sections, and a supporting bracket provided with a portion extending transversely through one of the tubular sections and the joint member to immovably connect said section to the joint member.

4. A joint for a door hanger track, comprising transversely apertured tubular track sections having abutting ends, a cylindrical transversely apertured joint member partly inserted in both sections, and supporting brackets provided with shouldered projecting studs extending through the apertures of the track sections and having their outer ends upset to rivet the parts together and the shoulders bearing against the outer surfaces of the track sections, one of said projecting studs also passing through the apertures of the cylindrical joint member.

In testimony whereof, I affix my signature, in presence of two witnesses.

IRVIN W. DAVIS.

Witnesses:
C. H. KEENEY,
ANNA F. SCHMIDTBAUER.